United States Patent
Tong et al.

(10) Patent No.: US 8,164,912 B2
(45) Date of Patent: Apr. 24, 2012

(54) SECURITY PROTECTION BOX

(76) Inventors: Cunliang Tong, Shenzhen (CN); Shuxian Shi, Shenzhen (CN)

( * ) Notice: Subject to any disclaimer, the term of this patent is extended or adjusted under 35 U.S.C. 154(b) by 333 days.

(21) Appl. No.: 12/524,245

(22) PCT Filed: Oct. 9, 2007

(86) PCT No.: PCT/CN2007/002902
§ 371 (c)(1), (2), (4) Date: Jul. 23, 2009

(87) PCT Pub. No.: WO2009/036609
PCT Pub. Date: Mar. 26, 2009

(65) Prior Publication Data
US 2010/0103631 A1    Apr. 29, 2010

(30) Foreign Application Priority Data
Sep. 21, 2007    (CN) .......................... 2007 1 0077207

(51) Int. Cl.
*H05K 5/02* (2006.01)
(52) U.S. Cl. .......................... 361/752; 361/730; 174/520
(58) Field of Classification Search ................... 361/752, 361/730, 728; 174/520
See application file for complete search history.

(56) References Cited

U.S. PATENT DOCUMENTS

| | | | | |
|---|---|---|---|---|
| 4,811,288 A * | 3/1989 | Kleijne et al. | ................... | 365/52 |
| 5,159,629 A * | 10/1992 | Double et al. | ................... | 713/194 |
| 5,353,350 A * | 10/1994 | Unsworth et al. | ............ | 713/194 |
| 5,389,738 A * | 2/1995 | Piosenka et al. | ............... | 174/528 |
| 6,245,992 B1 * | 6/2001 | Hou | ................... | 174/50 |
| 6,355,316 B1 * | 3/2002 | Miller et al. | ...................... | 428/13 |
| 6,512,454 B2 * | 1/2003 | Miglioli et al. | ............... | 340/541 |
| 6,853,093 B2 * | 2/2005 | Cohen et al. | ................... | 257/678 |
| 6,970,360 B2 * | 11/2005 | Sinha | .......................... | 361/752 |
| 7,054,162 B2 * | 5/2006 | Benson et al. | ................. | 361/760 |
| 7,535,373 B2 * | 5/2009 | Dalzell | .......................... | 340/652 |
| 7,549,064 B2 * | 6/2009 | Elbert et al. | ................... | 713/194 |

FOREIGN PATENT DOCUMENTS

| | | |
|---|---|---|
| CN | 2397605 Y | 9/2000 |
| CN | 1510810 A | 7/2004 |

OTHER PUBLICATIONS

International Search Report of PCT/CN2007/002902, dated Jul. 3, 2008.

* cited by examiner

*Primary Examiner* — Dameon Levi

(57) ABSTRACT

The present invention is adapted for field of electronic circuit protection and provides a security protection box, for enclosing the protected region of a protected circuit board in order to protect the elements in the protected region. The security protection box comprises a circuit board. The circuit board with thin center and thick periphery forms a box shape, and has the circuit routing layers. The circuit routing layers trigger the associated circuit to erase or destroy the information in the elements in the protected region when the circuit routing layers are physically attacked. The present invention protects the elements in the protected region through covering the protected region on the protected circuit board with a circuit board having thin center and thick periphery.

9 Claims, 2 Drawing Sheets

SECURITY PROTECTION BOX

TECHNICAL FIELD

The present invention is directed to field of electronic circuit protection, and especially to a security protection box which can protect elements on a circuit board against being attacked.

BACKGROUND

Nowadays, some high sensitive data information stored in the electronic circuit, such as bank information, passwords, poll code and so on, is often attacked and embezzled without any authorization. Therefore, more and more attention is paid to protect these data, and so all kinds of protection devices and methods are presented continuously. Among these methods, a method, which is relatively effective to prevent the sensitive data information from being attacked without any authorization, is used to prevent the sensitive data information from being embezzled by memorizing a software for encrypting or decrypting the sensitive program or data in a memory device. However, this approach relies on keys of encryption and decryption memorized in the memory device, which also require physical and electronic protection to avoid being attacked easily.

SUMMARY

An object of an embodiment of the present invention is to provide a security protection box, which intends to settle the problem of the sensitive data information of elements in the electronic circuits being embezzled by physical means.

The embodiment of the present invention is carried out in this way: a security protection box for enclosing a protected region of a protected circuit board so as to protect the elements in the protected region. The security protection box includes a circuit board. The circuit board with a thin center and a thick periphery forms a box shape, and is provided with circuit routing layers. The circuit routing layers trigger associated circuit to erase or destroy the information in the elements in the protected region when the circuit routing layers are physically attacked.

The present invention protects the elements in the protected region through covering the protected region in the protected circuit board with a box-shaped circuit board, which has thin center and thick periphery and is disposed on the protected circuit board.

THE PREFERRED EMBODIMENTS

Objects, technical schemes and advantages of the present invention will be more apparent from the following detailed description of the embodiments with reference to the accompanying drawings. However, it is to be appreciated that the following description of the embodiments is merely to explain the present invention and is no way intended to limit the present invention.

The embodiment of the present invention is to enclose the important elements on the protected circuit board by providing the box-shaped circuit board with the thin center, thick periphery and the circuit routing layers at a side of the protected circuit board, where attacking usually happens. In case that it happens to destroy the important electronic elements or embezzle the sensitive data information of the electronic elements, the wiring of the security protection box is broken or short-circuit so as to trigger the associated circuit to destroy or erase the sensitive data information of the important elements on the protected circuit board, thereby preventing it from being detected or stolen.

Figure 1:
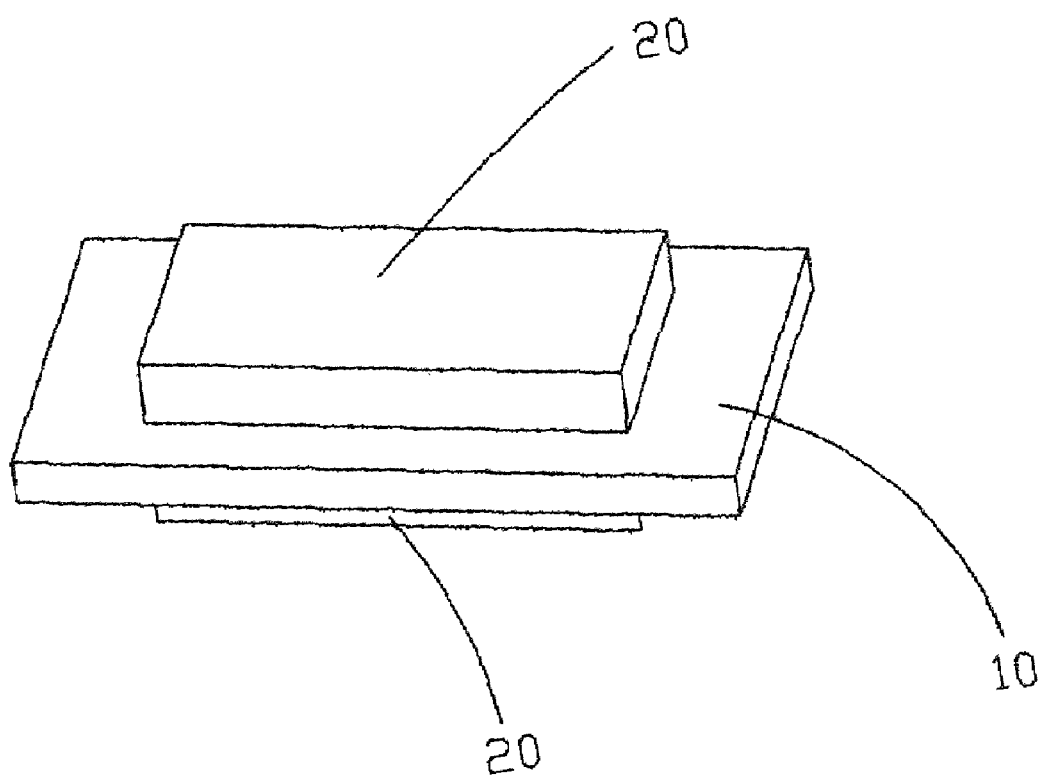
FIG. 1 is a schematic, perspective view of a security protection box in the working mode provide by an embodiment of the present invention.
Figure 2:
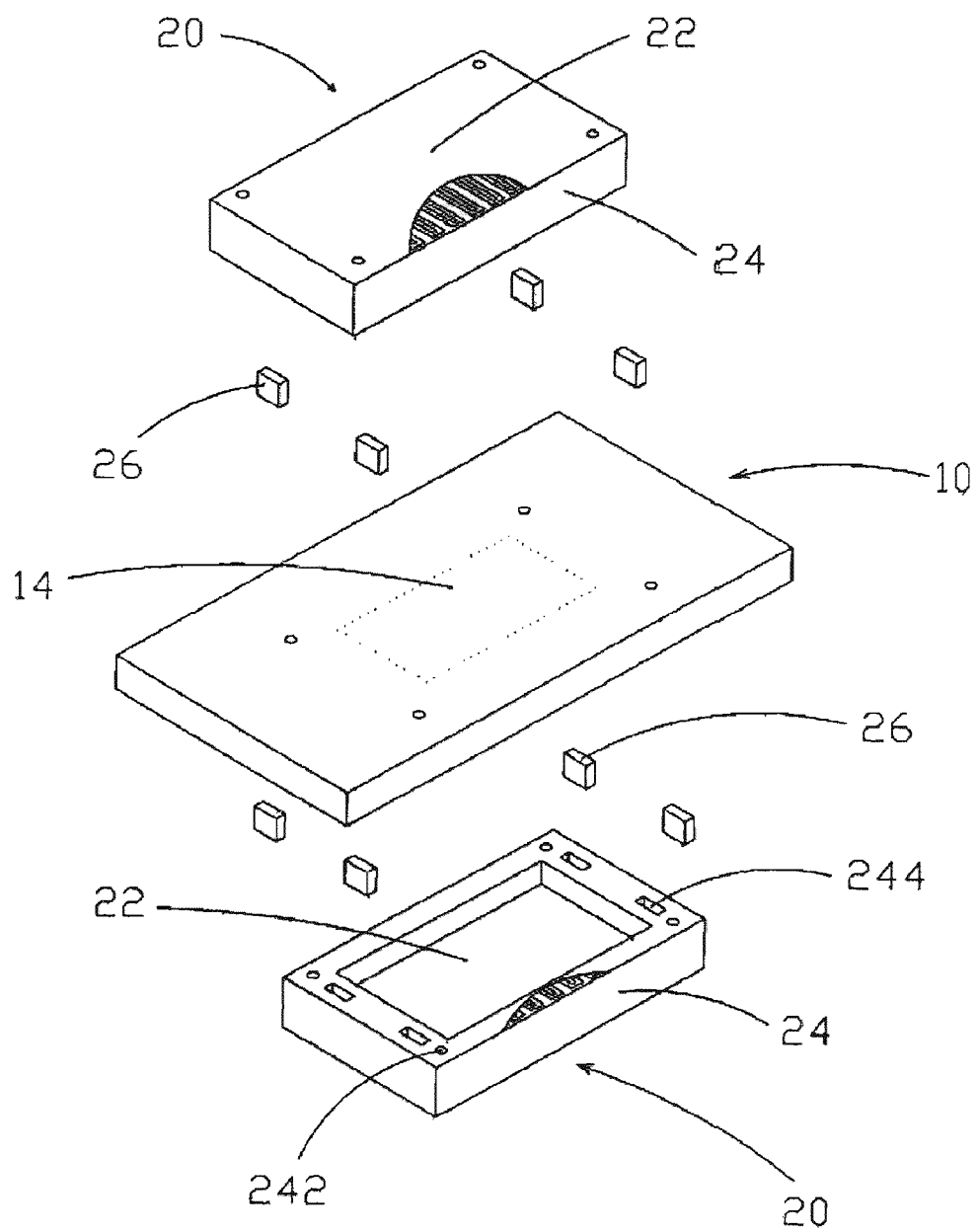
FIG. 2 is a schematic, exploded view of a part of FIG 1.

The protected circuit board 10 may be a mainboard of POS (point of sales) machines or the circuit boards used in other devices. Referring to FIG. 1 and FIG. 2, the protected circuit board 10 may be a printed circuit board with multi-layer routing, on which the protected region is shown with the dashed line and is designated by reference number 14 in FIG. 2. Some important elements, such as central process unit, flash memory, static random access memory, dynamic random access memory, security monitor chip, integrated circuit chip, bus, safety testing wiring etc., are disposed in the protected region 14 on the protected circuit board 10. Both sides of the protected circuit board 10 are provided with one security protection box 20. Clearly, the box 20 could be provided only at one side of circuit board 10, and at the same time the metal wiring is arranged at the other side of circuit board 10. The metal wiring will be broken or short-circuit when suffering from the manual physical attack so as to trigger the associated circuit to destroy or erase the sensitive data information of the important elements on the protected circuit board 10, thereby preventing it from being detected or stolen. The security protection box 20 covers on the protected region 14, and encloses the elements in the protected region 14. The security protection 20 includes a circuit board with thin center and thick periphery, on which circuit routing layer is provided. In this embodiment, the security protection box 20 includes a board body 22 and a wall body integrally extending from the circumferential edge of the board body 22. The wall body 24 covers on the protected regions 14, and surrounds outside the protected regions 14. The board body 22 could be a hard or flexible circuit board, and the wall body 24 could be a hard circuit board. A fixed hole 242 is defined in the wall body 24, and so the security protection box 20 can be positioned in place by a screw (not shown) drilling through the fixed hole 242 in the wall body 24. The security protection box further includes electrically conductive bars 26. Strip-shaped grooves 244 are defined in the wall body 24, and the electrically conductive bars 26 are mounted in the strip-shaped grooves 244. The electrically conductive bars 24 is in physical contact with an interior of the security protection box 20, and the protection box 20 achieves the electrical connection with the protected circuit board 10 by the electrically conductive bars 24. Circuit routing layers are provided in both the board body 22 and wall body 24, and the routing layer includes two circuitous parallel wirings thereon, one of which connects with an up level, and the other connects with a low level. The wirings in the board body 22 could be arranged to connect with the wirings in the wall body 24. It is clear that both wirings can be relatively independent from each other. When the routing layers on the security protection box 20 are broken or short-circuit, the level signal on the wirings will change so as to trigger the associated circuit to destroy or erase the sensitive data information of the important elements on the protected circuit board, thereby preventing the date information from being detected or stolen.

Herein described embodiments are preferred embodiments of the present invention but it should not be construed as limiting the overall scope of the present invention. It will be apparent that various modifications, replacements and variations may be made in the present invention without departing from the spirit or scope of the present invention.

Industrial Applicability

The present invention is adapted for field of electronic circuit protection and provides a security protection box, for enclosing the protected region of a protected circuit board in order to protect the elements in the protected region. The security protection box comprises a circuit board. The circuit board with thin center and thick periphery forms a box shape, and has the circuit routing layers. The circuit routing layers trigger the associated circuit to erase or destroy the information in the elements in the protected region when the circuit routing layers are physically attacked. The present invention protects the elements in the protected region through covering the protected region on the protected circuit board with a circuit board having thin center and thick periphery.

What is claimed is:

1. A security protection box, for enclosing a protected region of a protected circuit board to protect elements in the protected region, the security protection box comprising:
   a circuit board, the circuit board having thin center and thick periphery and forming a box shape, the circuit board being provided with circuit routing layers thereon, the circuit routing layers triggering associated circuit to erase or destroy the information in the elements in the protected region when the circuit routing layers are physically attacked,
   the circuit board including a board body and a wall body integrally extending from a circumferential edge of the board body, the board body covering on the protection region, the wall body surrounding outside the protection region; and
   one or more electrically conductive bars, one or more strip-shaped grooves being defined in the wall body, the electrically conductive bars being mounted in the strip-shaped grooves.

2. The security protection box of claim 1, wherein the circuit routing layers are separately provided in the board body and the wall body.

3. The security protection box of claim 1, wherein the board body is parallel to the protected circuit board and the wall body is vertical with respect to the board body.

4. The security protection box of claim 1, wherein the board body is a flexible circuit board and the wall body is a hard circuit board.

5. The security protection box of claim 1, wherein the circuit board is a hard circuit board.

6. The security protection box of claim 2, wherein each routing layer comprises two circuitous parallel wirings, one of which connects with up level and the other of which connects with low level, a level signal on the wiring being change when the wiring is broken or short-circuited, accordingly triggering the associated circuit to destroy or erase the sensitive data information of the elements on the protected circuit board.

7. The security protection box of claim 6, wherein the wirings of the board body is electrically connected to those of the wall body.

8. The security protection box of claim 1, wherein a fixed hole is defined in the wall body, the security protection box being positioned in place by a screw drilling through the fixed hole in the wall body.

9. The security protection box of claim 1, wherein the electrically conductive bars are in physical contact with an interior of the security protection box, the protection box achieving electrical connection with the protected circuit board by the bars.

* * * * *